US00RE39733E

(19) United States
(12) Reissued Patent
Morris et al.

(10) Patent Number: US RE39,733 E
(45) Date of Reissued Patent: Jul. 17, 2007

(54) IMPELLER FOR COOLANT PUMPS

(75) Inventors: R. David Morris, Fairfield, IL (US); John Boyer, Mt. Vernon, IL (US); Curtis Ulm, Geff, IL (US); George Tomlinson, Fairfield, IL (US)

(73) Assignee: United Components, Inc., Washington, DC (US)

(21) Appl. No.: 10/884,825

(22) Filed: Jul. 2, 2004

Related U.S. Patent Documents

Reissue of:
(64) Patent No.: 6,413,039
Issued: Jul. 2, 2002
Appl. No.: 09/585,163
Filed: Jun. 1, 2000

(51) Int. Cl.
*F01D 11/00* (2006.01)

(52) U.S. Cl. ..... 415/111; 415/169.1; 415/193 R

(58) Field of Classification Search ..... 415/111, 415/169.1, 180, 175, 176; 416/95, 179, 181, 416/182, 185, 193 R
See application file for complete search history.

(56) References Cited

U.S. PATENT DOCUMENTS

| | | | | | |
|---|---|---|---|---|---|
| 2,116,387 | A | * | 5/1938 | Lapham | 415/172.1 |
| 3,594,102 | A | * | 7/1971 | Oden | 417/23.11 |
| 4,752,183 | A | | 6/1988 | Sakurai | 415/12 |
| 4,762,465 | A | | 8/1988 | Friedrichs | 416/185 |
| 4,795,167 | A | | 1/1989 | Otsuka | |
| 4,891,876 | A | | 1/1990 | Freeman | 29/156.8 R |
| 4,925,367 | A | | 5/1990 | Paliwoda et al. | |
| 4,936,744 | A | | 6/1990 | Dosch et al. | 415/169.1 |
| 5,224,821 | A | | 7/1993 | Ozawa | 415/169.1 |
| 5,224,823 | A | * | 7/1993 | Cordts | 416/185 |
| 5,242,268 | A | | 9/1993 | Fukazawa et al. | 416/188 |
| 5,573,374 | A | | 11/1996 | Giberson | 416/186 R |

* cited by examiner

*Primary Examiner*—Richard A. Edgar
(74) *Attorney, Agent, or Firm*—Jeffrey S. Sokol; Cook & Franke S.C.

(57) ABSTRACT

[A cooling water pump for internal combustion engine includes a base and an outer cover forming a water input chamber, an impeller supported on a shaft within said chamber, fed shaft includes a bearing/seal unit mounted within the base and the shaft extended outwardly for connection to the engine. A one-piece, fully enclosed and double shrouded impeller is secured to the shaft. Impeller has a central hub with an outer peripheral concave surface, a bottom convex end wall, vanes are secured to the central portion of the concave wall in the bottom wall and project outwardly therefrom with an outer top shroud. The base has a recess within which the bearing/seal unit is mounted. The recess extends outwardly beyond the outer edge convex wall of the hub from a cooling chamber. The vanes direct a portion of the water flowing through the passageway into the recess for cooling purposes and then back into the radially outer portion of the passageway for discharge with the flowing water into the outlet passageway. The radially inner end of the shroud and outer convex wall overlap each other to form a controlled entrance into the outlet passageway to divert part of the flow into the recess.]*The invention pertains to a cooling water pump for an internal combustion engine. The pump has a base and a cover that form a water chamber. The chamber includes a one-piece, shrouded impeller secured to a drive shaft driven by the engine. The impeller has a central hub with vanes that project outwardly along with its integral shroud to form a flow passageway to a discharge opening. The base has a recess within which a bearing/seal unit is mounted. The recess extends outwardly beyond the hub to form a cooling passageway to the recess. A portion of the water flowing through the flow passageway is directed into the recess to cool the seal unit, and then back to the flow passageway for discharge. The shroud and hub can overlap to help control the flow to the recess.*

17 Claims, 3 Drawing Sheets

IMPELLER FOR COOLANT PUMPS

Matter enclosed in heavy brackets [ ] appears in the original patent but forms no part of this reissue specification; matter printed in italics indicates the additions made by reissue.

BACKGROUND OF THE INVENTION

This invention relates to a pump impeller for pumping a coolant and particularly for a water pump for cooling an internal combustion engine.

Water pumps for internal combustion engines are well known and are present in the larger internal combustion engines. A widely used water pump generally includes an impeller mounted within a housing. The impeller includes a plurality of spaced vanes secured on a round base. The impeller is secured to a drive shaft and is rotatably mounted within the walls of a pump housing. The housing includes an outer closure wall and a shroud over the outer ends of the impeller vanes. A one-piece fully enclosed and double shrouded impeller has been disclosed. However, the system of manufacture is expensive and involves a complex procedure requiring a special high maintenance die unit with a timed and multiple pull action such as found in a camera shutter. An alternative common impeller is a two-piece assembly in which a separate shroud is attached to the vanes of the impeller by a separate means, such as chemical bonding, sonic welding, or a mechanical connection. A one piece impeller with an integral shroud has been disclosed with a special arrangement and location of the shroud.

The water pumps for internal combustion engines generally operate in a high temperature environment. A seal unit is mounted with a bearing to the shaft at the base of the impeller. Cooling of the seal unit at the connection of the impeller shaft to the pump is significant. This requires special construction of the pump unit to maintain a long life assembly with minimum maintenance.

In summary, the prior art plastic impellers involve costly manufacturing procedures which involve costly equipment and various procedures or the case of forming separate components with separate bonding of the separately bonded areas present areas of possible failure and should provide seal cooling means. The present systems do not therefore provide a structure which permits the manufacture of a relatively simple structure for controlling the volume of water flow and efficient seal cooling.

SUMMARY OF THE INVENTION

The present invention provides a one-piece impeller design including an in-place molded shroud, which may be formed with known injection molding apparatus, thereby permitting a particularly cost-effective impeller. The molded impeller is readily constructed with a proper height and vane curvature to produce a specified flow, in combination with a shroud and flow control constructed to create proper cooling of a pump seal. The single piece impeller provides a more optimum flow of the coolant around the mechanical seat of the impeller. The result is a reduction in the operating temperature of the pump seals, with an increased operating life of the seal and the pump.

More particularly, the impeller of the present invention includes a single piece impeller including a central shaft mounting hub and impeller vanes integrally formed on the periphery of the hub. The hub includes a base portion projecting outward between the vanes and functioning in combination with an integral shroud secured to the outer edges of the vanes. The shroud extends from an inner portion overlying the outer peripheral portion of the hub base portion and then outwardly to the outer edge of the vanes. The impeller is mounted to the housing having a base and an outer housing cover. A shaft and seal assembly is secured within the base with the impeller hub secured to the shaft and with the seal unit adjacent the hub. The housing base has a coolant chamber about the seal unit which projects radially beneath the impeller and in spaced relation to the hub base portion. The housing is closed by an outer cover including an outlet passageway aligned with the outlet or discharge openings defined by the radial outer ends of the vanes and the adjacent opposed wall of the housing base. The overlapping portions of the hub base portion and the shroud direct part of the flow into the cooling gap and chamber beneath the hub base portion and the housing base portion. The flow into the cooling chamber circulates through the cooling area and back to the vane passageway to the exit opening from the vanes into the coolant outlet passageway.

In summary, the present invention thus provides a one-piece molded pump impeller having a central rotating hub unit and an outer shroud connected by a plurality of vanes defining a multiple coolant flow forming part of and directed to a common discharge or outlet passageway, with a portion of the flow circulated about a seal coolant chamber about the seal unit and to the backside of the rotating hub.

The impeller of the present invention is readily injection molded with well known injection molding equipment and with conventional plastic presently used in coolant pump impellers. The impeller of the present invention produces a highly cost-effective structure with both manufacturing and assembly costs, as well as an improved and long life pump assembly.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
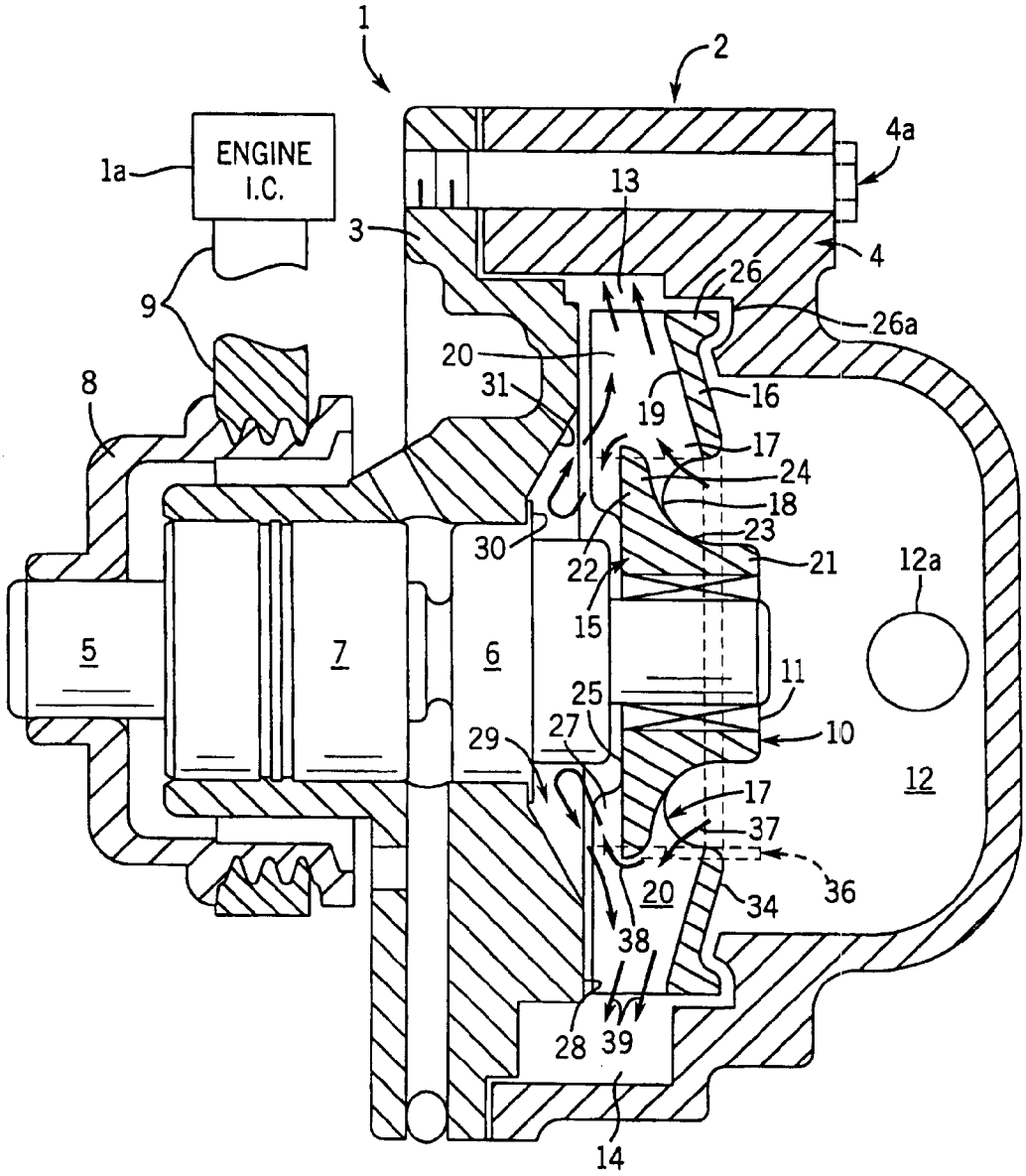
FIG. 1 is a cross-section of a water pump illustrating a preferred embodiment of the invention.

Referring to the drawings and particularly to FIG. 1, a water pump 1 is illustrated which is particularly adapted for an internal combustion engine, 1a. The pump 1 includes an outer housing 2, including a base 3 and an outer cover 4, which are bolted to each other, as at 4a. A pump shaft 5 is rotatably mounted within the base 3. The shaft 5 is supported within the base 3 by a seal/bearing unit including a rotating bearing unit [6] *7* and an inner shaft seal unit [7] *6* that seals the bearing. The outer end of shaft 5 includes a driven member 8 which receives a driving belt 9 connected in a known connection to a rotating output of the engine, 1a. The shaft 5 extends [inwardly] *upwardly* of base 3 into the outer cover 4. A water pump impeller 10 is secured to shaft 5 by a coupling 11. The cover 4 is a cup-shaped housing overlying the base 3 and forming a pumping chamber 12 with a water inlet 12a. An encircling output passageway 13 is formed at the outer peripheral connection of the outer cover 4 and the base 3. The outer passageway 13 includes a discharge opening 14.

The impeller 10 includes a central hub 15 secured to shaft 5 and an outer shroud 16 integrally connected to the hub 15 by a plurality of pump vanes 17. The impeller 10 is more fully shown in FIGS. 2–3, and clearly illustrating a molded embodiment of the present invention. A vertical cross-sectional view of impeller 10 is illustrated in FIG. 1.

The impeller 10 includes the plurality of curved vanes 17 which are radially spaced about the impeller and with the inner end portions 18 of each vane connected with the hub 15.

Each vane 17 extends axially and circumferentially from the hub. Each vane 17 is a shaped blade having the inner end portion 18 secured to the hub 15, and extending radially and circumferentially from the hub to an outer [axial] *radial* end edge. The adjacent vanes 17 extend from the hub 15 and from the base 3 and shroud 16, a flow passageway 20 to outlet passageway 13. The top edge 19 of each vane is connected to the corresponding edges 19 of all other vanes 17 by the shroud 16, which is inclined to direct the water to flow downwardly and peripherally into passageway 20, 13 and outlet opening 14.

The hub 15 is specially formed, as shown in FIG. 1, with a center portion 21 and an outer encircling bottom wall portion 22 joined to the center portion by a curved concave wall 23 to which the vanes 17 are secured. The outer edge 24 of the bottom wall portion 22 is formed as a concave wall to a flat radial bottom wall 25 of the hub 15.

Each vane 17 is shown integrally formed 15, preferably as a single piece molded member with the hub at the curved concave wall 23 of the hub. Each vane 17 has the top edge 19 which curves from the center area and wall 23 of the hub outwardly to the shroud 16. The vane is inclined downwardly with the shroud 16 to the end adjacent the outlet passages 13 and opening 14. The shroud 16 is a round, plate member secured to the top inclined edges 19 of vanes 17. The shroud 16 includes an upper protrusion or enlargement 26 at the outer edge. The encircling housing cover includes en overlaying mating recess portion 26a mating with and slightly spaced from the enlargement 26 to complete the output passageway.

The vanes 17 extend axially beneath the hub 15 as at 27, generally to the vane connection of edge 19. The bottom edge portion of the vane 17 extends from beneath the hub 15 and is spaced upwardly of the adjacent *or top* wall 28 of the housing base 3. The wall 28 has a central recess*, space* or cavity 29[,] with a short center wall portion 30 extending radially of the seal [7] *6* and an outer longer inclined wall portion 31 terminating in the horizontal wall 28 which extends beneath the vanes 17 outwardly of the hub and to the outlet opening 14. The cavity 29 forms a cooling chamber about the seal [7] *6*. The cavity 29 is connected to the water flow passageway 20 between the vanes at the convex outer edge 24 of the base wall portion 22.

Figure 2:
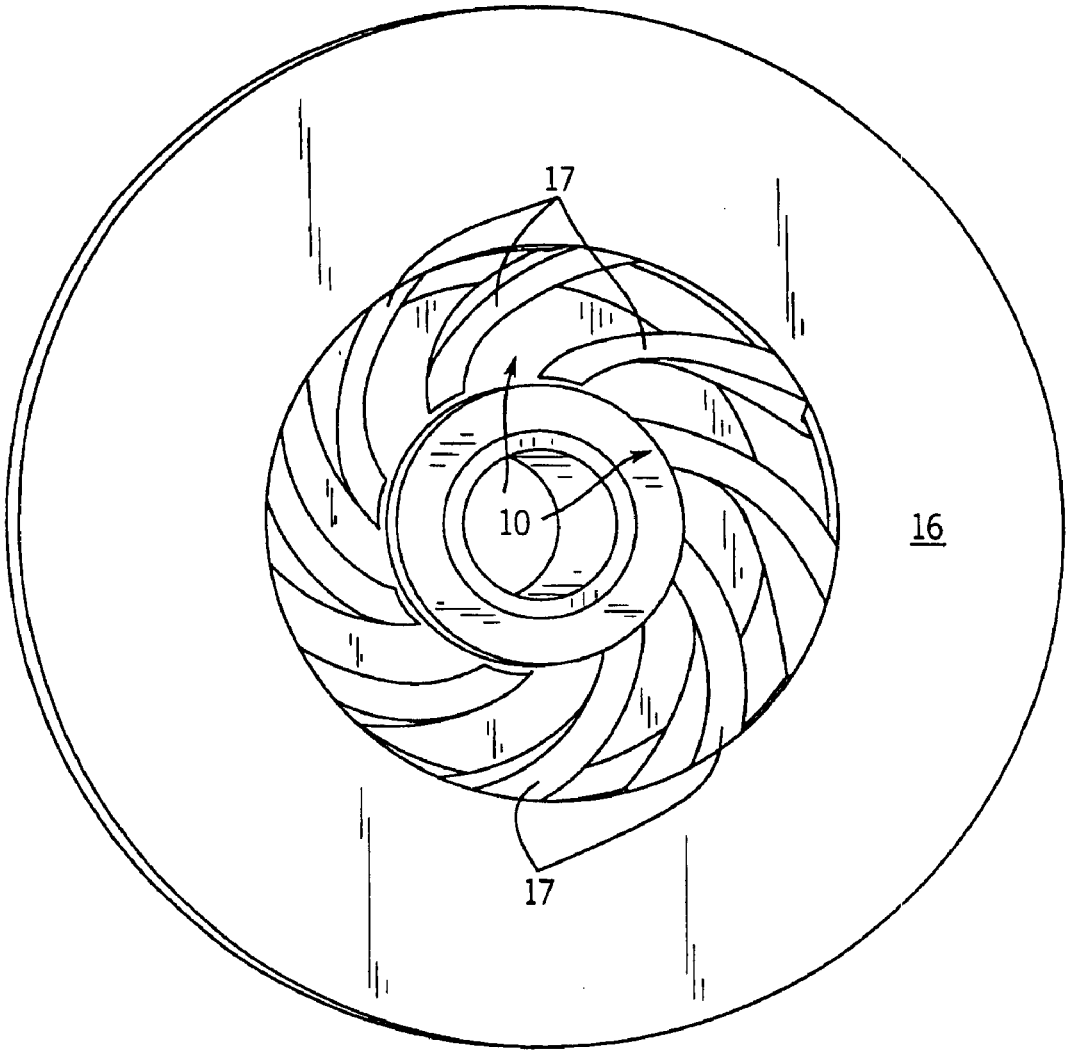
FIG. 2 is a top view of the impeller shown in FIG. 1.
Figure 3:
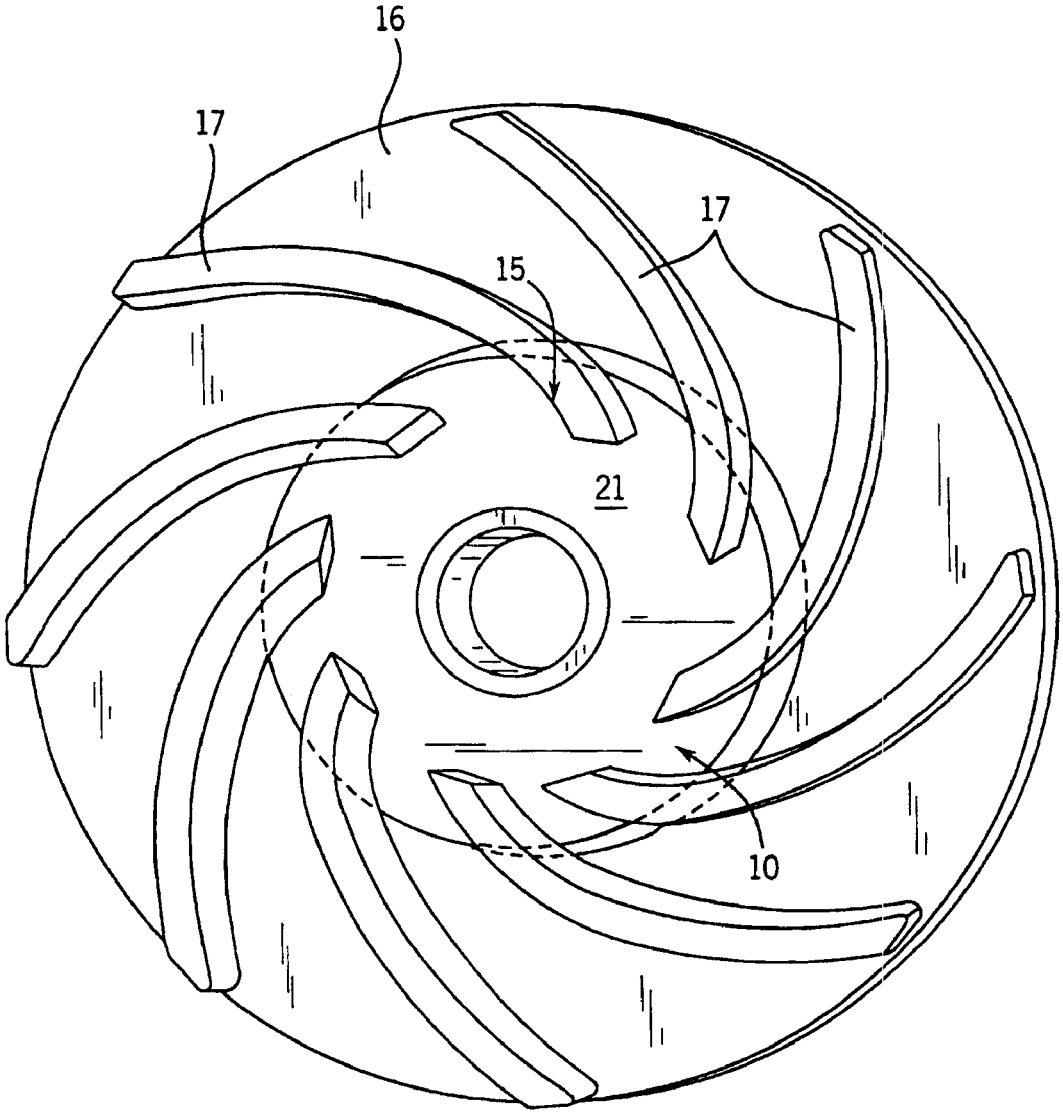
FIG. 3 is a bottom view of an impeller shown in FIG. 1 of the present invention.

The several vanes 17 are all connected to the hub 15 and project outwardly from the hub to the shroud 16 and base member in like spaced relation, as shown in FIGS. 2 and 3, to form the curved water flow passageways 30 to the output passageway 13 and opening 14.

The outer end portion, generally inclusive of the convex outer edge 24, of the hub 15 and the radially inner end portion 34 of the shroud 16 overlap at 36 and form a first passageway or entry portion joined to the continuous passageway 20 between the vanes, shroud and top wall of the base 3 to the discharge passageway 13 and opening 14.

As a result of the above constructions, the water flow includes a first flow portion or stream 37 which flows directly from the housing chamber 12 through the radially inner portion of passageway 20 to the outlet passageway 13 and opening 14 as at the entrance portion beneath the shroud 16 and aligned hub base. A second or inner flow portion 38 of the water is beneath the flow portion 37. The second flow portion 38 flows around convex outer edge 24 of hub 15 and into the cavity 29 between the hub bottom wall and the wall of the housing base. The water of flow portion 38 moves into the cooling recess or cavity 29 around the seal [7]*6*, across the bottom wall 30 and the inclined wall 31 to the pump [air]flow passageway, when it merges with the stream 39 to pass into the output passageway 13 and opening 14.

In summary, the operation of the engine or other device, drives the impeller 10, and the vanes 17 drive the water from the housing 2 directly to the outlet passageway 13 and opening 14, with part of the flow diverted through the seal cooling cavity 29 and therefrom, to the outlet passage 13, for discharge through opening 14.

The impeller 10 is preferably formed as an integral molded member in accordance with known molding technology, and particularly injection molding apparatus. The integral molded plastic impeller provides a low cost, long life unit which particularly contributes the long life of the pump unit.

Although shown in a preferred embodiment, the system of this invention includes the central passage defining support wall and the outer shroud defining wall arranged and connected as an integrated unit to form a water-directing passageway and flow in combination with a directed and impeller promoted seal cooling flow, and with the overlapping portions of the base and shroud with the two flows coupled to each other in the common end portion of the outlet passageway. The impeller is readily molded to particular flow specifications.

Various alternatives and embodiments are contemplated as being within the scope of the following claims particularly pointing out and distinctly claiming the subject matter regarded as the invention.

We claim:

[1. A water pump impeller for a cooling water pump unit including a housing defining a water chamber having a water inlet and a water outlet and having an impeller shaft in a seal/bearing unit mounted within the housing and configured to receive the water pump impeller connected to said impeller shaft within said water chamber, the improvement wherein said water pump impeller comprises a hub configured and constructed to be secured to said drive shaft and located within said water chamber, said hub having an outer peripheral wall extending from an innermost end of the hub axially and radially to a substantially flat bottom wall with the outer end of the hub spaced substantially from said water outlet;

a plurality of circumferentially spaced pump vanes secured in circumferentially spaced relation to the outer peripheral wall of said hub and extending outwardly of said hub into close spaced relation to said water outlet, each said pump vane extending radially outwardly from said bottom wall; and a shroud secured to the upper and radially outer edges of said vane extending outwardly beyond said hub into close spaced relation with said water outlet with said adjacent vanes defining flow passageways to the outer passageway of the housing wall adjacent said bottom wall, said shroud having a radially inner end portion overlying a radially outer portion of said hub to form an entrance portion of said flow passageway.]

[2. The water pump impeller of claim 1 wherein said hub and vanes and shroud are formed as a single molded unit.]

[3. The water pump impeller of claim 1 wherein the housing includes a bottom wall with the seal/bearing unit mounted in said bottom wall, and wherein said hub has a bottom wall located in spaced relation to the bottom wall of said housing, said vanes including an axial portion extending radially below said bottom wall of said hub and with said axial portion extending radially inwardly beneath said hub bottom wall, and said housing bottom wall having a cavity surrounding said seal/bearing unit, and said vanes and said hub constructed and configured to establish a diversion of a portion of the water from the flow passageway into and through said cavity and back to said flow passageway to positively cool the bearing/seal unit.]

[4. A water pump impeller for a cooling water pump unit having a cooling chamber defined by a housing and having a drive shaft rotatably mounted to said housing and projecting into said chamber, said housing having water inlet to said chamber and an outlet passageway from said chamber, said water pump impeller comprising a hub configured and constructed to be secured to said shaft within said chamber, said hub having an outer peripheral wall extending from an innermost portion of the hub axially and radially to a substantially flat bottom wall, a plurality of circumferentially spaced pump vanes secured in circumferentially spaced relation to the outer peripheral wall of said hub and extending outwardly of said hub, said pump vanes extending radially outwardly from said bottom wall and including a vane portion beneath the hub, and a shroud secured to the upper edges of said vane in spaced relation to said shaft and extending outwardly from said hub with said adjacent vane defining flow passageways to the outer passageway of the housing, said hub and vanes being constructed and configured to direct a portion of the water in said flow passageways into the space between said bottom wall of the hub and the housing wall adjacent said bottom wall to direct water into engagement with the seal/bearing unit.]

[5. The water pump impeller of claim 4 wherein said hub and shroud and vanes are formed as a single molded unit.]

[6. The water pump impeller of claim 5 wherein said impeller is formed of a plastic material.]

[7. The water pump impeller of claim 4 wherein said outer peripheral edge of said hub is a substantially convex wall and said bottom wall of the hub is a flat radial wall.]

[8. The water pump impeller of claim 4 wherein said housing includes a cavity with said seal/bearing unit located therein, and wherein said cooling water flow beneath said hub circulates through said cavity and about said seal/bearing unit.]

[9. The water pump impeller of claim 4 wherein said housing includes an encircling side wall for enclosing the outer radial portions of said impeller, said outlet passageway of said housing constructed and configured as a circumferential water passageway terminating in an outlet immediately adjacent to the peripheral portion of said impeller for movement of water from the housing into said circumferential water passageway of the housing.]

[10. The water pump impeller of claim 4 wherein the radially outer wall of said hub has a radially inner relatively constant diameter portion connected by a concave radial planar portion to a bottom edge portion, said bottom edge portion having a reverse convex curvature terminating in a flat bottom wall of said hub, said construction promoting the flow of a portion of the water in the flow passageway into said spaced between said bottom wall of the hub and the adjacent housing wall.]

[11. The water pump impeller of claim 4 wherein each of said vanes is correspondingly constructed and includes a curved radially inner portion connected to the hub and extending radially outwardly and axially to an inclined portion extending radially outwardly and downwardly to the other end of said vane, each of said vanes further including a integral lower portion extending downwardly beneath and inwardly of said hub with said lower portion further extending outwardly from the hub to the outlet passageway.]

[12. The water pump impeller of claim 11 wherein said hub, said vanes and said shroud are formed as a single integral molded member.]

[13. In combination, a cooling housing configured and constructed for interconnection to an internal combustion engine having a water inlet and a water outlet for connection to the engine cooling system, said water outlet begin connected to a circumferential outlet passageway adjacent an outer wall of said housing, said housing having a cover having an open end and a base, said base having a base wall with a shaft opening, said base being secured to the open end of said cover to close said chamber, a shaft rotatably mounted within said shaft opening, said base wall and including an outer exposed drive shaft connection and an inner shaft portion, said base wall having an encircling cavity about said shaft opening, a bearing and seal unit mounted within said shaft opening and projecting inwardly of said base within said cavity, an impeller secured to the end of said shaft within said housing, said impeller having a hub secured to said shaft, said hub having a substantially concave circumferential surface, a plurality of circumferentially spaced and like vanes secured to said hub and having a radially inner portion connected to said concave circumferential surface and extending radially outwardly and circumferentially therefrom, each of said vanes projecting axially downwardly beneath said bottom wall of said hub and having an inner portion terminating in close spaced relation to said cavity, said vanes terminating in spaced relation to said outlet passageway, a shroud connected to the top outer edges of said vanes and defining circumferentially spaced flow passageways from said chamber to said circumferential outlet passageway whereby rotation of said impeller draws water through said cover and discharges the same into said outlet passageway with a portion of the water flow being directed by said vanes and said hub about the outer edge of said hub and into and through said cavity and thereby cooling of said bearing and seal unit.]

[14. The combination of claim 13 wherein the radially outer edge of said hub is a substantially convex wall terminating in the bottom wall of said hub, said bottom wall being a substantially planar radial wall, the base having a flat upper wall opposing said hub bottom wall, said cavity being formed in said base upper wall and including a radial portion immediately adjacent said bearing and seal unit and an inclined outwardly extended outer wall extending from said radial portion to said flat bottom wall of said base, said vanes projecting below said bottom wall of the hub and extending radially inwardly to a distance substantially corresponding to the location of said inclined wall.]

[15. The combination of claim 13 wherein said impeller is formed as a single molded member including the hub, vanes and shroud.]

*16. A water pump impeller for a cooling water pump unit of an internal combustion engine, the cooling water pump*

*unit having a cooling chamber defined by a housing and having a drive shaft rotatably mounted via a seal/bearing unit to said housing and projecting into the chamber, the housing having a water inlet to the chamber and an outer passage from the chamber, said water pump impeller comprising:*

*a hub configured and constructed to be secured to the shaft within the chamber, said hub having an outer peripheral wall extending from an innermost portion of said hub axially and radially to a substantially flat bottom wall;*

*a plurality of circumferentially spaced pump vanes secured in circumferentially spaced relation to said outer peripheral wall of said hub and extending outwardly of said hub, said pump vanes extending radially outwardly from said hub and having upper edges;*

*a shroud secured to said upper edges of said vanes in spaced relation to the shaft and extending outwardly from said hub with said adjacent vanes defining flow passageways to the outer passage of the housing; and,*

*said hub, shroud and vanes being constructed and configured to direct a portion of the water in said flow passageways into a cavity between said bottom wall of the hub and the housing to direct water into engagement with the seal/bearing unit.*

*17. The water pump impeller of claim 16 and wherein said hub, shroud and vanes are formed as a single molded unit.*

*18. The water pump impeller of claim 16 and wherein said impeller is formed of a plastic material.*

*19. The water pump impeller of claim 16 and wherein said outer peripheral wall of said hub is a substantially convex wall and said bottom wall of said hub is a flat radial wall.*

*20. The water pump impeller of claim 16 and wherein the seal/bearing unit is located in said cavity, the seal/bearing unit having a seal, and wherein the cooling water flowing beneath said hub circulates through said cavity and about said seal.*

*21. The water pump impeller of claim 16 and wherein the housing includes an encircling side wall for enclosing outer radial portions of said impeller, the housing further constructed and configured with a circumferential water passageway terminating in an outlet immediately adjacent to a peripheral portion of said impeller for movement of water from the housing into the outer passage of the housing.*

*22. The water pump impeller of claim 16 and wherein a radially outer wall of said hub has a radially inner relatively constant diameter portion connected by a concave radial planar portion to a bottom edge portion, said bottom edge portion having a reverse convex curvature terminating in a flat bottom wall of said hub, said construction promoting the flow of a portion of the water in said flow passageways into said cavity.*

*23. The water pump impeller of claim 16 and wherein each of said vanes is correspondingly constructed and includes a curved radially inner portion connected to said hub and extending radially outwardly and axially to an inclined portion extending radially outwardly and downwardly to an outer end of said vane, each of said vanes further including an integral lower portion extending downwardly beneath and inwardly of said hub with said lower portion further extending outwardly from said hub to the outer passage.*

*24. The water pump impeller of claim 16 and wherein said hub and shroud overlap.*

*25. The water pump impeller of claim 16 and wherein the housing has an adjacent wall adjacent said bottom wall of said hub, and said adjacent wall and cavity extend from the seal/bearing unit to beyond said outer peripheral wall of said hub.*

*26. The water pump impeller of claim 25 and wherein said adjacent wall has an inclined wall portion that forms said cavity and slopes toward the seal/bearing unit.*

*27. The water pump impeller of claim 16 and wherein said vanes have a portion beneath said hub.*

*28. A water pump impeller for a cooling water pump unit of an internal combustion engine, the cooling water pump unit having a chamber defined by a housing and having a drive shaft rotatably mounted to the housing via a seal/bearing unit and projecting into the chamber, the housing having a water inlet to the chamber and an outer passage from the chamber, said water pump impeller comprising:*

*a hub configured and constructed to be secured to the shaft within the chamber, said hub having an outer peripheral wall extending from an innermost portion of said hub axially and radially to a substantially flat bottom wall, the housing having an adjacent wall adjacent said bottom wall of said hub, and said adjacent wall forming a cavity that extends from the seal/bearing unit radially outward to beyond said outer peripheral wall of said hub, said adjacent wall having a portion that forms said cavity proximal the seal/bearing unit;*

*a plurality of circumferentially spaced pump vanes secured in circumferentially spaced relation to said outer peripheral wall of said hub and extending outwardly of said hub, said vanes extending radially outwardly from said hub and having upper edges;*

*a shroud secured to said upper edges of said vanes in spaced relation to the shaft and extending outwardly from said hub with said adjacent vanes defining flow passageways to the outer passage of the housing; and,*

*wherein said hub, shroud and vanes are formed as a simple integral molded member, and said hub, shroud and vanes direct a portion of the water in said flow passageways into said cavity and into engagement with the seal/bearing unit.*

*29. The water pump impeller of claim 28 and wherein said vanes have a portion beneath said hub.*

*30. The water pump impeller of claim 28 and wherein said portion of said adjacent wall is an incline wall portion that slopes toward the seal/bearing unit, and wherein said hub, shroud, vanes and inclined wall portion direct a portion of the water in said flow passageways into said cavity and into engagement with the seal/bearing unit.*

*31. The water pump impeller of claim 28 and wherein said hub has a radially outer portion and said shroud has a radially inner end portion, and said radially outer portion of said hub overlaps said radially inner end portion of said shroud.*

*32. The water pump impeller of claim 28 and wherein the seal/bearing unit has a seal and said impeller directs said portion of water into engagement with said seal.*

* * * * *